(12) United States Patent
Baehr-Jones

(10) Patent No.: US 12,298,648 B2
(45) Date of Patent: May 13, 2025

(54) OPTICAL MODULATOR WITH TWISTED ELECTRODES

(71) Applicant: Luminous Computing, Inc., Santa Clara, CA (US)

(72) Inventor: Thomas W. Baehr-Jones, Arcadia, CA (US)

(73) Assignee: Luminous Computing, Inc., Santa Clara, CA (US)

(*) Notice: Subject to any disclaimer, the term of this patent is extended or adjusted under 35 U.S.C. 154(b) by 237 days.

(21) Appl. No.: 18/069,251

(22) Filed: Dec. 21, 2022

(65) Prior Publication Data

US 2024/0210783 A1 Jun. 27, 2024

(51) Int. Cl.
| | |
|---|---|
| *G02F 1/21* | (2006.01) |
| *G02F 1/01* | (2006.01) |
| *G02F 1/025* | (2006.01) |
| *G02F 1/225* | (2006.01) |

(52) U.S. Cl.
CPC ........... *G02F 1/212* (2021.01); *G02F 1/0121* (2013.01); *G02F 1/025* (2013.01); *G02F 1/2255* (2013.01)

(58) Field of Classification Search
None
See application file for complete search history.

(56) References Cited

U.S. PATENT DOCUMENTS

2018/0239176 A1* 8/2018 Tsuzuki .................. G02F 1/025

* cited by examiner

*Primary Examiner* — Chad H Smith
(74) *Attorney, Agent, or Firm* — Stratford Group Ltd.

(57) ABSTRACT

A significant challenge occurs when two Mach-Zehnder optical modulators are placed in close proximity next to one another, resulting in substantial cross talk. An optical modulator configured to reduce crosstalk between adjacent optical modulators includes a positive polarity signal electrode electrically coupled between a driver and an optical phase shifting section, and a negative polarity signal electrode electrically. The positive polarity signal electrode comprises a first positive polarity signal electrode section extending adjacent to a first optical waveguide path, and a second positive polarity signal electrode section extending adjacent to a second optical waveguide path. The negative polarity signal electrode comprises a first negative polarity signal electrode section extending adjacent to the second optical waveguide path and the first positive polarity signal electrode section, and a second negative polarity signal electrode section extending adjacent to the first optical waveguide path and the second positive polarity electrode section.

19 Claims, 11 Drawing Sheets

OPTICAL MODULATOR WITH TWISTED ELECTRODES

TECHNICAL FIELD

The present disclosure relates to an optical modulator, and in particular to an optical modulator including electrodes with alternating polarity.

BACKGROUND

Mach-Zehnder optical modulators have been used for many years in the field of optical communications for receiving electrical modulated data signals, e.g. radio frequency signals, and converting the electrical modulated data signals into optical modulated data signals for transmission on an optical waveguide. In a conventional Mach-Zehnder optical modulator 10, a beam splitter 12 divides the input optical signal (unmodulated) into two sub-beams travelling along separate optical waveguide 15A and 15B, at least one of which has a phase modulator in which the refractive index is a function of the strength of the local electric field. The sub-beams are then recombined at an optical combiner 16 into an optical modulated data signal for output the output port 17. Changing the electric field on the phase modulating path will then determine whether the two sub-beams interfere constructively or destructively at the optical combiner 16, and thereby control the amplitude or intensity of the exiting light.

The travelling wave signal electrodes 13A and 13B are in direct contact with the optical waveguides 15A and 15B. This has the advantage of few conductors, but the disadvantage that the loading capacitance per unit length can no longer be independently adjusted by changing the fill factor. A conventional approach to driving the optical modulator 10, known as differential drive. Both outputs of an RF driver 61 are connected through two waveguides, e.g. coaxial cables 63, to the travelling wave signal electrodes 13A and 13B, and the outer conductors of both coaxial cables 63 are grounded via connection to the first and second ground electrodes G1 and G2. Both outputs of the RF driver 61 have a characteristic output impedance 62. In the case of differential drive modulation, the ground conductors of the two coaxial cables 63 are connected to the ground transmission line electrodes G1 and G2. Nominal termination loads 65, e.g. 50 ohms for each of S+ and S−, are connected across the distal ends of the travelling wave signal electrodes 83A and 83B. The outputs from the RF driver 61 are in anti-phase, i.e., S+ and S− are 180° out of phase, and the modulation voltage across the travelling wave signal electrodes 83A and 83B is S+ minus S−. In this configuration both RF driver outputs are utilized, greatly improving the power efficiency compared to the single-ended drive condition.

A significant challenge occurs when two such Mach-Zehnder optical modulators are placed in close proximity next to one another, resulting in substantial cross talk, in particular inductive coupling, which cannot be eliminated by a simple metal barrier.

An object of the present disclosure is to provide an optical modulator configured to reduce crosstalk between adjacent optical modulators.

SUMMARY

Accordingly, a first apparatus includes an optical modulator system comprises:
a first optical modulator comprising:
a first input port for receiving a first input optical signal; a first optical beam splitter for splitting the first input optical signal into a first optical sub-beam and a second optical sub-beam; a first optical waveguide path optically coupled to the first optical beam splitter for transmitting the first optical sub-beam; a first optical phase shifting section configured to adjust a first phase of the first optical sub-beam; a second optical waveguide path optically coupled to the first optical beam splitter for transmitting the second optical sub-beam, a first optical beam combiner optically coupled to the first optical waveguide path and the second optical waveguide path for combining the first optical sub-beam and the second optical sub-beam into a first modulated optical output signal;
a first driver configured for transmitting a modulated radio frequency data signal; a first positive polarity signal contact electrically coupled between the first driver and the first optical phase shifting section, and comprising a first positive polarity electrode section and a second positive polarity electrode section extending along parallel but non-colinear paths; and a first negative polarity signal contact electrically coupled between the first driver and the first optical phase shifting section, and comprising a first negative polarity electrode section extending parallel to the first positive polarity electrode section and colinear with the second positive polarity electrode section, and a second negative polarity electrode section extending parallel to the second positive polarity electrode section and colinear with the first positive polarity electrode section.

In a second exemplary embodiment an optical modulator system comprises:
a first optical modulator comprising:
a first input port for receiving a first input optical signal; a first optical beam splitter for splitting the first input optical signal into a first optical sub-beam and a second optical sub-beam; a first optical waveguide path optically coupled to the first optical beam splitter for transmitting the first optical sub-beam; a first optical phase shifting section configured to adjust a phase of the first optical sub-beam; a second optical waveguide path optically coupled to the first optical beam splitter for transmitting the second optical sub-beam; a second optical phase shifting section configured to adjust a phase of the second optical sub-beam; a first optical beam combiner optically coupled to the first optical waveguide path and the second optical waveguide path for combining the first optical sub-beam and the second optical sub-beam into a first modulated optical output signal;
a first driver configured for transmitting a modulated radio frequency data signal; a first positive polarity signal contact electrically coupled between the first driver and the first optical phase shifting section, and comprising a first positive polarity electrode section and a second positive polarity electrode section extending along parallel but non-colinear paths; a first ground contact electrically coupled to the first optical phase shifting section; a first negative polarity signal contact electrically coupled between the first driver and the second optical phase shifting section, and comprising a first negative polarity electrode section extending parallel to the first positive polarity electrode section and colinear with the second positive polarity electrode section, and a second negative polarity electrode section extending parallel to the second positive polarity electrode section and colinear with the first positive polarity electrode section; and a second ground contact electrically coupled to the second optical phase shifting section.

In any of the aforementioned embodiments the first optical phase shifting section may comprise:
- a first p-type semiconductor region adjacent to the first optical waveguide path;
- a first p-type contact region extending from the first p-type semiconductor region and electrically connected to the first positive polarity electrode section and the second positive polarity electrode section;
- a first n-type semiconductor region adjacent to the first optical waveguide path; and
- a first n-type contact region, extending from the first n-type semiconductor region and electrically connected to the first negative polarity electrode section and the second negative polarity electrode section.

In any of the aforementioned embodiments the optical modulator system may further comprise a second optical phase shifting section configured to adjust a second phase of the second optical sub-beam;
- wherein the first positive polarity signal contact is electrically coupled between the first driver and the second optical phase shifting section; and
- wherein the first negative polarity signal contact is electrically coupled between the first driver and the second optical phase shifting section.

In any of the aforementioned embodiments the second optical phase shifting section may comprise:
- a second p-type semiconductor region adjacent to the second optical waveguide path;
- a second p-type contact region extending from the second p-type semiconductor region and electrically connected to the first negative polarity electrode section and the second negative polarity electrode section;
- a second n-type semiconductor region adjacent to the second optical waveguide path; and
- a second n-type contact region, extending from the second n-type semiconductor region and electrically connected to the first positive polarity electrode section and the second positive polarity electrode section.

In any of the aforementioned embodiments the optical modulator system may comprise a photonic integrated circuit (PIC) comprising:
- a first waveguide layer including the first input port, the first optical beam splitter, the first optical waveguide path, the first optical phase shifting section, the second optical waveguide path, the second optical phase shifting section, and the first optical beam combiner;
- a first upper back end of line region including the first positive polarity signal contact, and the first negative polarity signal contact;
- one or more dielectric regions between waveguide layer and the upper back end of line region;
- a first plurality of contact vias extending downwardly through the one or more dielectric regions from the first positive polarity electrode section and from the second positive polarity electrode section to the first p-type contact region;
- a second plurality of contact vias extending downwardly through the one or more dielectric regions from the first negative polarity electrode section and the second negative polarity electrode section to the first n-type contact region.

In any of the aforementioned embodiments some of the first plurality of contact vias may include portions that extend underneath the first negative polarity signal contact to reach the first p-type contact region.

In any of the aforementioned embodiments the first positive polarity signal contact may include a third positive polarity electrode section extending adjacent to the first optical waveguide path; and
- wherein the first negative polarity signal contact includes a third negative polarity electrode section extending adjacent to the second optical waveguide path.

In any of the aforementioned embodiments the first positive polarity electrode section may have a first length that is shorter than a second length of the second positive polarity electrode section.

In any of the aforementioned embodiments the first length may be about ¼ an overall length of the first positive polarity signal contact; the second length may be about ½ the overall length of the first positive polarity signal contact; and a third length of the third positive polarity electrode section may be about ¼ the overall length of the first positive polarity signal contact.

In any of the aforementioned embodiments optical modulator system may further comprise:
- a second optical modulator comprising:
  - a second input port for receiving a second input optical signal;
  - a second optical beam splitter for splitting the second input optical signal into a third optical sub-beam and a fourth optical sub-beam;
  - a third optical waveguide path optically coupled to the second optical beam splitter for transmitting the third optical sub-beam,
  - a third optical phase shifting section configured to adjust a third phase of the third optical sub-beam;
  - a fourth optical waveguide path optically coupled to the second optical beam splitter for transmitting the fourth optical sub-beam;
  - a fourth optical phase shifting section configured to adjust a fourth phase of the fourth optical sub-beam;
  - a second optical beam combiner optically coupled to the third optical waveguide path and the fourth optical waveguide path for combining the third optical sub-beam and the fourth optical sub-beam into a second modulated optical output signal;
- a second driver configured for transmitting a second modulated radio frequency data signal;
- a second positive polarity signal contact electrically coupled between the second driver and the third optical phase shifting section, and comprising a third positive polarity electrode section and a fourth positive polarity electrode section extending along parallel but non-colinear paths; and
- a second negative polarity signal contact electrically coupled between the first driver and the first optical phase shifting section, and comprising a third negative polarity electrode section extending parallel to the third positive polarity electrode section and colinear with the fourth positive polarity electrode section, and a fourth negative polarity electrode section extending parallel to the fourth positive polarity electrode section and colinear with the third positive polarity electrode section;
- wherein the first positive polarity electrode section has a different length than the third positive polarity electrode section;
- wherein the second positive polarity electrode section has a different length than the fourth positive polarity electrode section;

wherein the first negative polarity electrode section has a different length than the third negative polarity electrode section; and wherein the second negative polarity electrode section has a different length than the fourth negative polarity electrode section.

BRIEF DESCRIPTION OF THE DRAWINGS

Some example embodiments will be described in greater detail with reference to the accompanying drawings, wherein.

DETAILED DESCRIPTION

Figure 1:
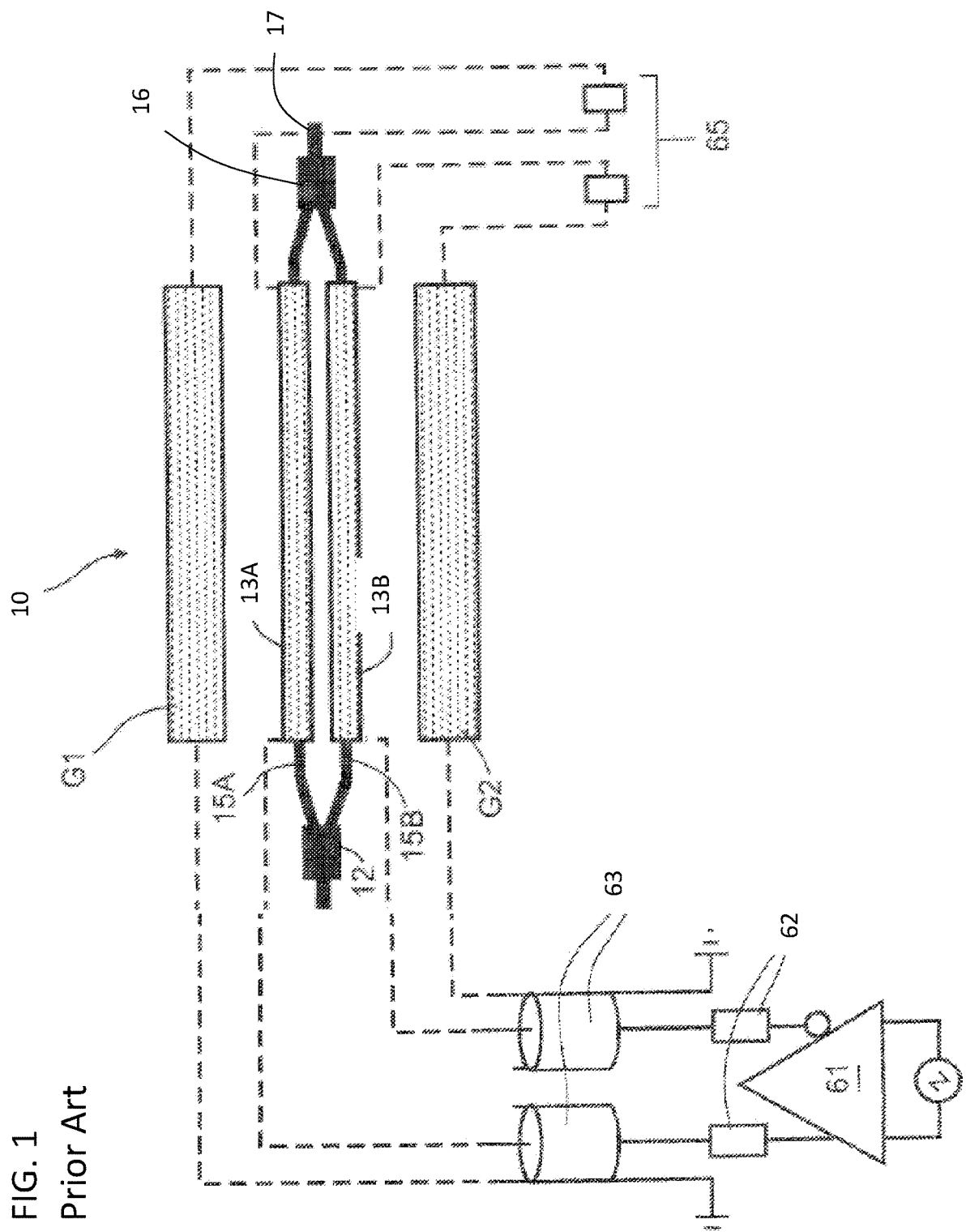
FIG. 1 is a schematic diagram of a conventional optical modulator.

While the present teachings are described in conjunction with various embodiments and examples, it is not intended that the present teachings be limited to such embodiments. On the contrary, the present teachings encompass various alternatives and equivalents, as will be appreciated by those of skill in the art.

With reference to FIGS. 2-6B, a Mach-Zehnder optical modulator 70 is configured for receiving electrical modulated data signals, e.g. radio frequency signals, and converting the electrical modulated data signals into optical modulated data signals for transmission on an optical waveguide. In the Mach-Zehnder optical modulator 70, an input optical waveguide 71 transmits and launches an input optical signal from a source of light, e.g. laser, to a beam splitter 72, which is configured for dividing or splitting the source light into two sub-beams travelling along separate optical waveguide paths 73 and 74, at least one, but preferably both, of which has a phase modulator in which the refractive index is a function of the strength of the local electric field. The sub-beams are then recombined at an optical combiner 75 onto an output optical waveguide 76 and into an optical modulated data signal. Exemplary modulation schemes include pulse-amplitude modulation, such as PAM-16 and/or PAM of any other suitable level, and quadrature amplitude modulation, such as QAM-16 or any other suitable level. Changing the electric field on the phase modulating path will then determine whether the two sub-beams interfere constructively or destructively at the output, and thereby control the amplitude or intensity of the exiting light. The first and second optical waveguide paths 73 and 74 may comprise any suitable high index optical waveguide material, such as silicon or germanium or any other group III-IV semiconductor material, e.g. InP.

The Mach-Zehnder optical modulator 70 includes a plurality of transmission line conductors, including first and second travelling-wave signal conductors 81 (S+) and 82 (S−), each with a corresponding first and second ground conductor 83 and 84, respectively. In some embodiments, nominal loads 86, e.g. two 100 ohm resistors in parallel, connect the distal ends the first travelling-wave signal conductor 81 with the first ground conductor 83, and the distal ends the second signal conductor 82 with the second ground conductor 84.

Each travelling-wave signal conductor 81 and 82 is oriented substantially parallel to, e.g. over and/or adjacent to, the first and second optical waveguide paths 73 and 74. The travelling-wave signal conductors 81 and 82 convey an RF signal in an RF path that is substantially parallel to the first and second optical waveguide paths 73 and 74. Each pair of the travelling-wave signal conductors 81 and 82 is connected to one or both of the first and second phase shifting sections 85a and 85b, adjacent to the first and second optical paths 73 and 74, to impart a phase change to the optical wave in the optical waveguide paths 73 and 74. It should be noted that the optical and electrical signals propagate in substantially the same direction along the optical modulator 70. To minimize cross-talk between adjacent optical modulators 70, in particular between the travelling wave signal conductors 81 and 82 of adjacent optical modulators 70, the first travelling-wave signal conductor 81 with the first polarity, e.g. positive, is comprised of a plurality of interconnected electrode sections, one or more first sections 81a, which extend along and adjacent to the first optical path 73 and one or more second sections 81b, which extend along and adjacent to the second optical path 74. Similarly, the second travelling wave signal conductor 82 with the second polarity, e.g. negative, is comprised of a plurality of interconnected electrode sections, one or more first sections 82a, which extend along and adjacent to the second optical path 74 and one or more second sections 82b, which extend along and adjacent to the first optical path 74. The first sections 81a of the first travelling wave signal conductor 81 extend parallel to and with corresponding equal lengths to the first sections 82a the second travelling wave signal conductor 82, and the second sections 81b extend parallel to and with corresponding equal lengths to the second sections 82b. The sections, e.g. first and second sections 81a and 81b, of the first travelling-wave signal conductor 81 are electrically connected to each other, as are the sections, e.g. the first and second 82a and 82b, of the second travelling-wave signal conductor 82. Ideally, the first section 81a of the first polarity (positive) travelling wave signal conductor 81 extends parallel to the first section 82a of the second polarity travelling wave signal conductor 82 and colinear with the second section 82b the second polarity (positive) travelling wave signal conductor 82. Similarly, the second section 81b of the first travelling wave signal conductor 81 extends parallel to the second section 82b of the second travelling wave signal conductor 82 and colinear with the first section 82a of the second travelling wave signal conductor 82. The first positive polarity signal electrode section 81a and the second positive polarity signal electrode section 81b extending along parallel but non-colinear paths, similar to the first negative polarity signal electrode section 82a and the second positive polarity signal electrode section 82b, which also extend along parallel but non-colinear paths, whereas the first positive polarity signal electrode section 81a and the second negative polarity signal electrode section 82b extend collinearly, while the second positive polarity signal electrode section 81b and the first negative polarity signal electrode section 82a extend collinearly.

In some embodiments the optical modulator 70, 70' or 70" comprises a SOI (silicon on insulator) or silicon based multi-layer opto-electronic PIC (photonic integrated circuit) device including a substrate layer 91, which may comprise silicon or other suitable material, such as a crystal substrate, e.g. lithium niobate or lithium tantalate. An optical waveguide layer 92 is provided over the substrate layer 91 with an optional buried oxide (BOX) layer 93, e.g. silicon dioxide, therebetween. The optical waveguide layer 92 includes the first optical waveguide path 73 extending through the first optical phase shifting section 85a configured to adjust a phase of the first optical sub-beam travelling therethrough. In some embodiments, the first optical phase shifting section 85a includes a first p-i-n junction comprising a first undoped intrinsic semiconductor region, defining the first optical waveguide path 73 between a first p-type doped semiconductor region 96a and a first n-type doped semiconductor region 97a. The p-i-n junctions can be arranged parallel to the waveguide propagation direction, perpendicular to the propagation direction, at an oblique angle to the propagation direction, or at any suitable arrangement.

The first optical phase shifting section 85a comprises a first highly doped p-type contact region 98a extending from the first p-type semiconductor region 96a, and a first highly doped n-type contact region 99a, extending from the first n-type semiconductor region 97a, which are typically more heavily doped than the semiconductor regions 96a and 97a because they are used for ohmic contacts. The n-type and p-type semiconductor regions 96a, 96b, 97a and 97b may be doped to a carrier density of $10^{15}$ to $10^{20}$ carriers per cubic centimeter, preferably between $3\times10^{17}$ to $3\times10^{18}$ carriers per cubic centimeter.

The optical waveguide layer 92 also includes the second optical waveguide path 74 extending through the second optical phase shifting section 85b configured to adjust a phase of the second optical sub-beam travelling therethrough. The second optical phase shifting section 85b includes a second p-i-n junction comprising an undoped intrinsic semiconductor region, defining the second optical waveguide path 74 between a second p-type doped semiconductor region 96b and a second n-type doped semiconductor region 97b. The optical waveguide layer 92 also includes a second highly doped p-type contact region 98b extending from the second p-type semiconductor region 96b, and a second highly doped n-type contact region 99b, extending from the second n-type semiconductor region 97b, which are typically more heavily doped than the semiconductor regions 96b and 97b because they are used for ohmic contacts. The optical waveguide layer 92 may be comprised of silicon sandwiched between cladding layers of dielectric material, such as silicon dioxide, or some other suitable waveguide material, e.g. a group III-IV material, such as Ge or InP, or a hybrid silicon and group III-IV material.

Figure 2:
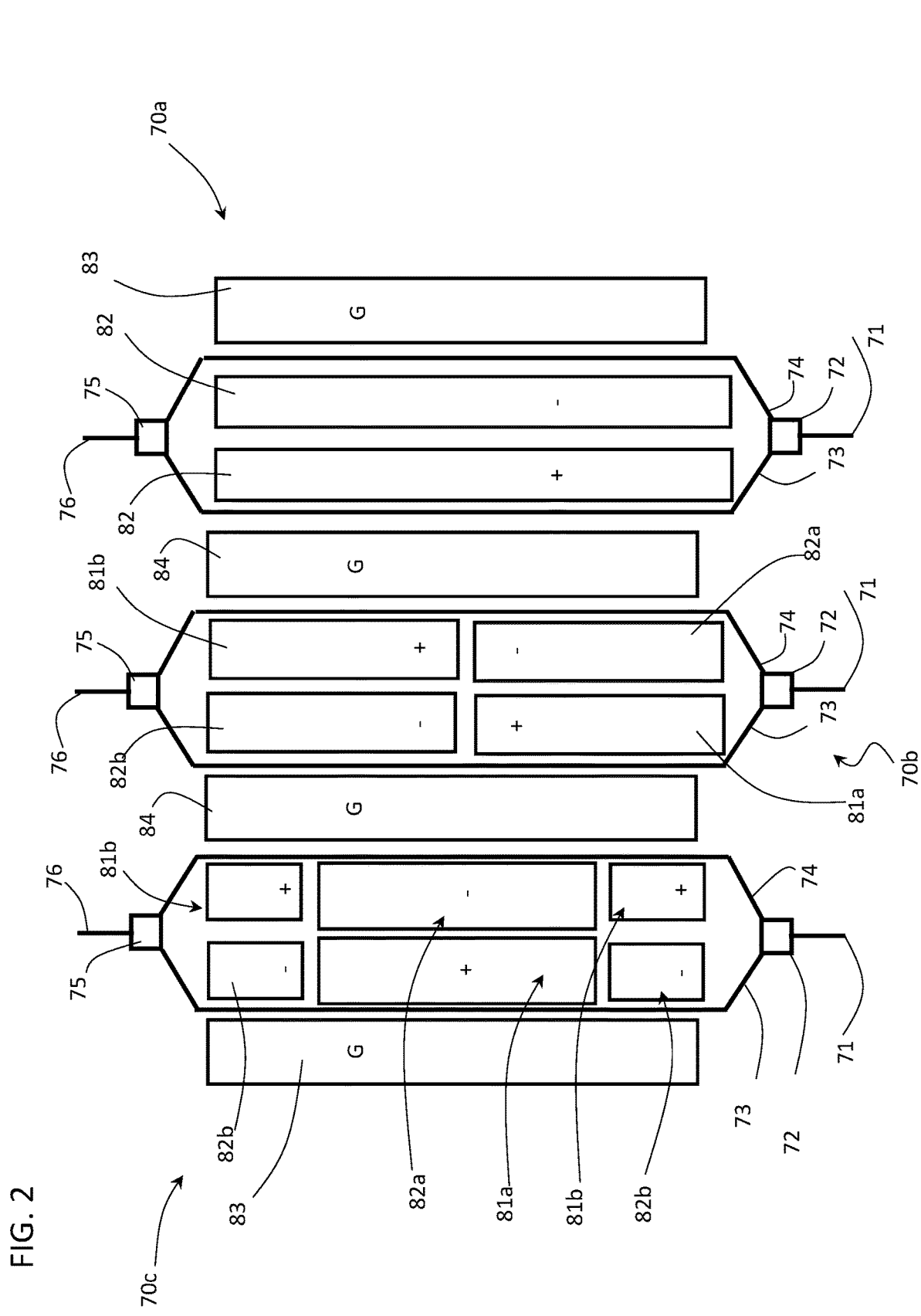
FIG. 2 is a top view of an exemplary embodiment of a plurality of optical modulators in accordance with the present invention.
Figure 3:
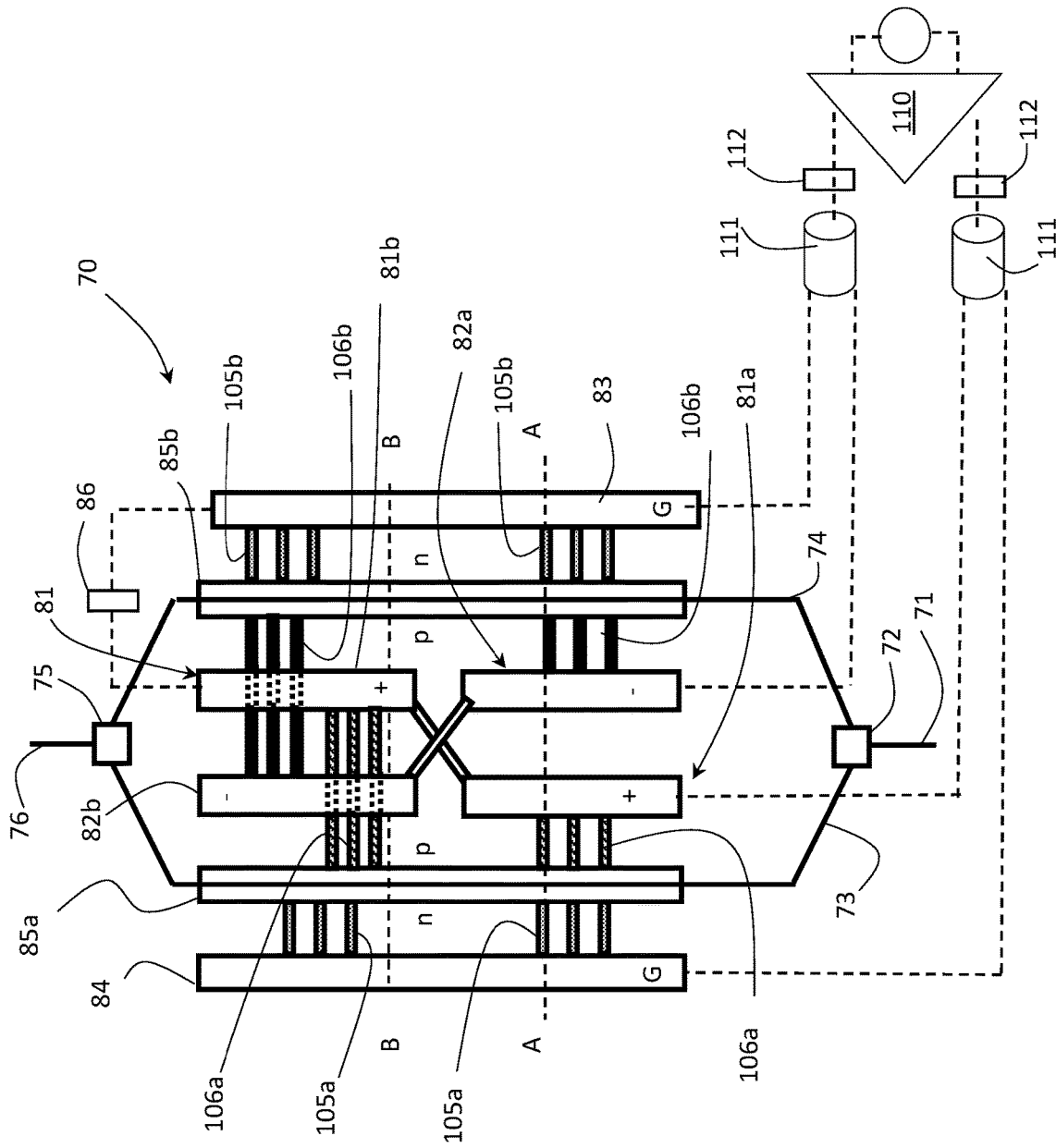
FIG. 3 is a top view of an exemplary embodiment of an optical modulator in accordance with the present invention.

The first and second travelling wave signal conductors 81 (S+) and 82 (S−), and the first and second ground conductor 83 and 84, are provided and aligned in an back end of line region 101, which is separated from the waveguide layer 92 by one or more dielectric, e.g. silicon dioxide, regions 102. To further reduce cross-talk between adjacent optical modulators 70, which primarily comes from the current flow in the first and second travelling-wave signal conductors 81 (S+) and 82 (S−) in the upper back end of line region 101, each of the first and second travelling-wave signal conductors 81 and 82 are divided into sections 81a and 81b and 82a and 82b and positioned on different alternating sides of the first and second optical paths 73 and 74, as seen in FIGS. 2, 3 and 5. Moreover, in some embodiments, the sections of the first and second travelling-wave signal conductors 81 (S+) and 82 (S−) in adjacent optical modulators 70 may be staggered relative to each other, so that some of the sections of the first and second travelling-wave signal conductors 81 (S+) and 82 (S−) in one optical modulator 70 do not start and end at the same position along the optical waveguide paths 73 and 74 than the sections in the adjacent optical modulators 70. Accordingly, the first and second travelling-wave signal conductors 81 (S+) and 82 (S−) in adjacent optical modulators 70 may have different sizes, and/or may have a different number of sections. e.g. a first optical modulator 70a may have a first and second travelling wave signal conductors 81 and 82 comprised of a single section, whereas a second modulator 70b may have the first and second travelling wave signal conductors 81 (S+) and 82 (S−) comprised of two equally sized sections 81a/81b and 82a/82b, whereas a third modulator 70c may have first and second travelling wave signal conductors 81 (S+) and 82 (S−) comprised of three sections 81b/81a/81b and 82b/82a/82b with at least one of the sections having a length longer length than at least one of the other sections. As illustrated in FIG. 4, the third modulator 70c includes first and second travelling wave signal conductors 81 (S+) and 82 (S−) comprised of a first shorter section 81b and 82b, e.g. about ¼ the total overall length, followed by a second longer section 81a and 82a, e.g. about ½ the total length, and a third shorter section 81b and 82b, e.g. about ¼ the total length, whereas the second modulator 70b includes first and second travelling wave signal conductors 81 (S+) and 82 (S−) with first and second equally long sections, e.g. ½ the total length, which are longer than the short sections, so that the second sections 81a and 81b of the third modulator 70c start at a different location than the second sections 81a and 81b of the second modulator 70b. Ideally, the sections of the first and second travelling wave conductors 81 and 82 in the plurality of optical modulators, e.g. 70a, 70b and 70c, are arranged and configured such that the cross talk therebetween is substantially reduced, and preferably averages out to zero.

Figure 4A:
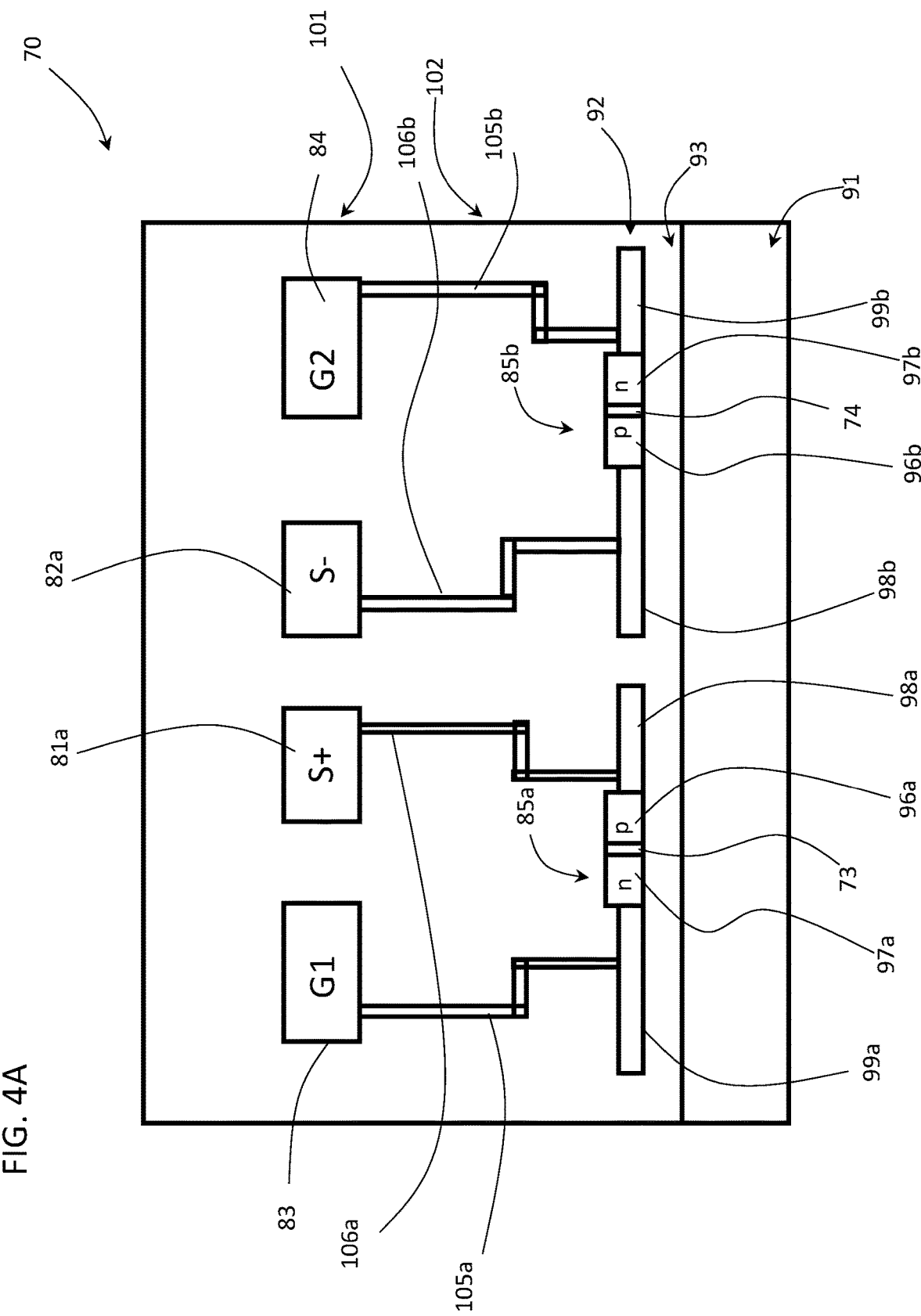
FIG. 4A is a cross-sectional view of the optical modulator of FIG. 3 along section A-A.
Figure 4B:
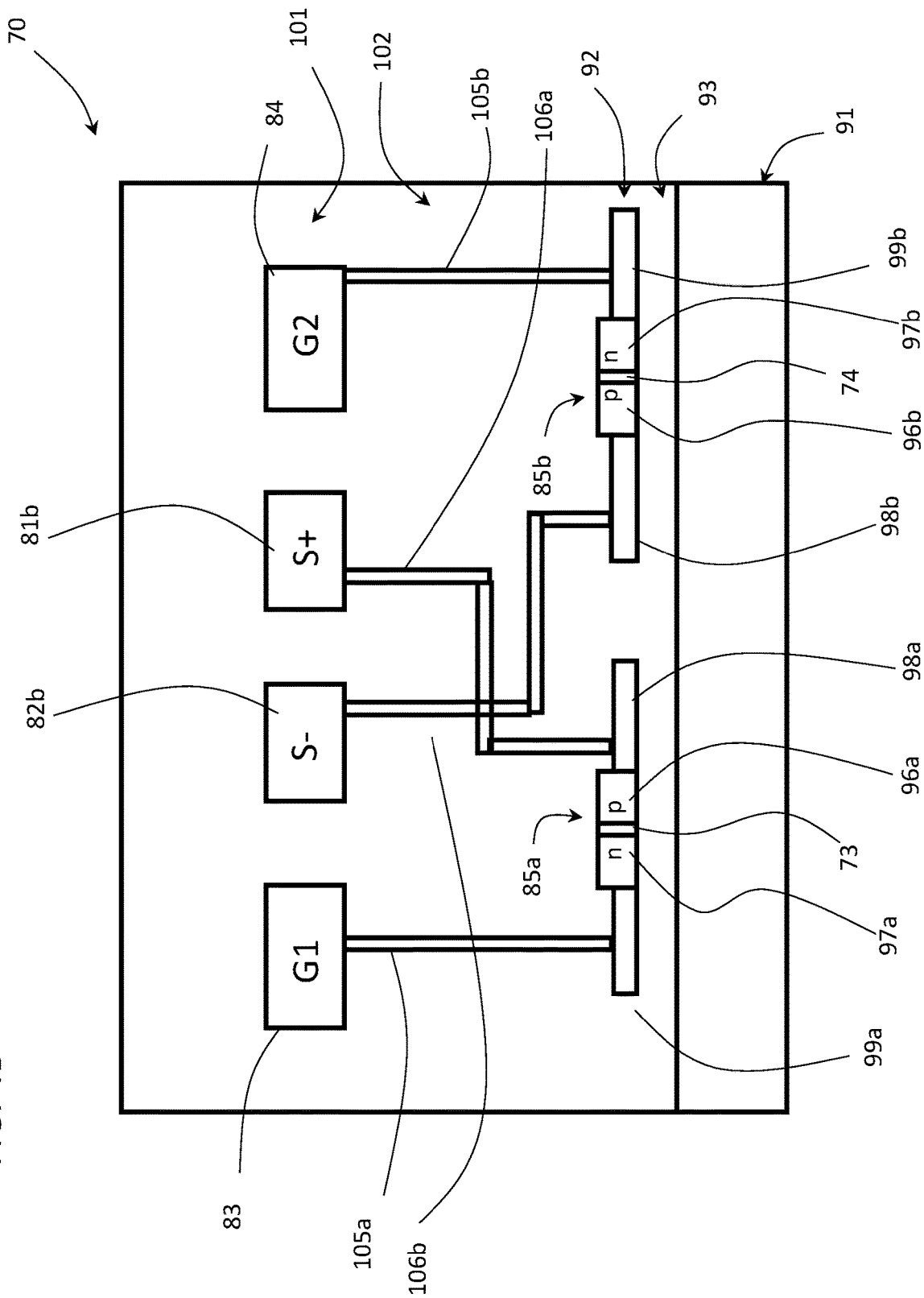
FIG. 4B is a cross-sectional view of the optical modulator of FIG. 3 along section B-B.
Figure 5:
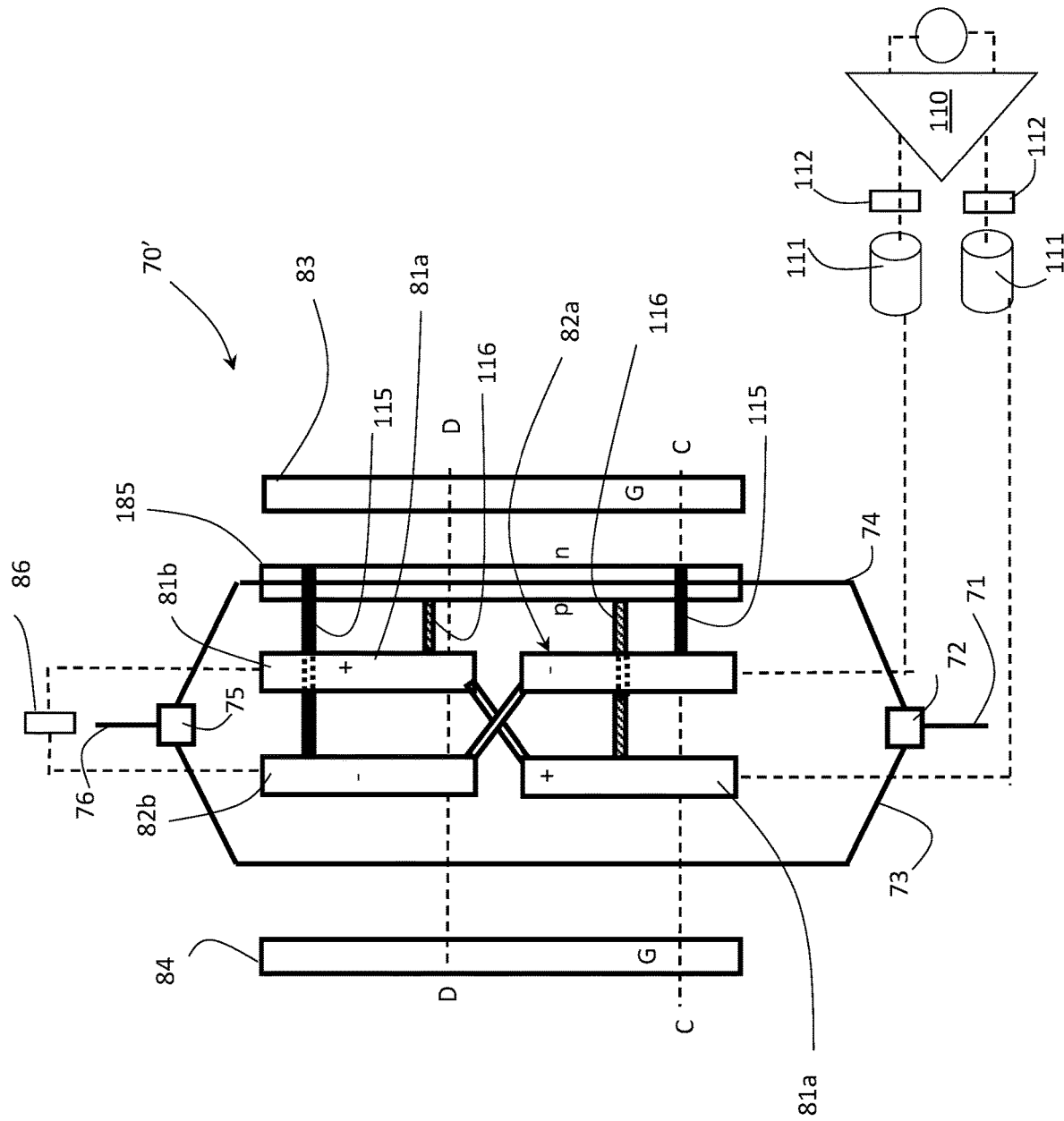
FIG. 5 is a top view of an exemplary embodiment of an optical modulator in accordance with another exemplary embodiment of the present invention.

According to a first exemplary embodiment illustrated in FIGS. 3, 4A and 4B, conductive, e.g. metal, ground vias 105a and 105b extend downwardly from the first and second ground conductors 83 and 84, respectively, through the one or more dielectric regions 102 to the first and second highly doped n-type contact regions 99a and 99b, respectively. First conductive, e.g. metal, signal vias 106a extend downwardly from the sections of the first travelling-wave signal conductor 81 (S+), through the one or more dielectric regions 102 to the first and second highly doped p-type contact region 98a, respectively. Second conductive, e.g. metal, signal vias 106b extend downwardly from the sections of the second travelling-wave signal conductor 82 (S−) through the one or more dielectric regions 102 to the highly doped p-type contact regions 98b.

In order to maintain the same polarity for the highly doped p-type contact regions 98a and 98b along their entire length, the first and second conductive signal vias 106a and 106b are configured to extend downwardly and are laterally offset as well as longitudinally offset in different layers of the one or more dielectric regions 102, as illustrated in FIGS. 3 and 4B, so that the first and second conductive signal vias 106a and 106b are electrically isolated and insulated from each other. In particular, when the sections of the first and second travelling wave conductors 81 and 82 are not directly over the contact regions 98a and 98b, the first and second conductive signal vias 106a and 106b may include portions that have to extend beneath the sections of the other polarity first and second travelling-wave conductor 81 and 82, e.g. in a crisscrossing manner. For example, the first conductive signal vias 106a extending from the second section 81b of the first travelling-wave signal conductor 81 include portions that extend under the second section 82b of the second travelling-wave signal conductor 82 to reach the p-type contact region 98a. Similarly, the second conductive signal vias 106b extending from the second section 82b of the second travelling-wave signal conductor 82 include portions that extend under the second section 81b of the first travelling-wave signal conductor 81 to reach the p-type contact region 98b.

In some embodiments, there are a plurality of the first conductive ground vias 105a extending from the first ground conductor 83, e.g. in parallel to each other and evenly spaced along the n-type contact regions 99a, and there are a plurality of the second conductive ground vias 105b extending from the second ground conductor 84, respectively, e.g. in parallel to each other and evenly spaced along the n-type contact region 99b.

Similarly, there may be a plurality of the first conductive signal vias 106a extending from the sections of the first travelling wave signal conductors 81, e.g. in parallel to each other and evenly spaced along the p-type doped contact regions 98a or 98b, depending on which section of the second travelling-wave signal conductor 81, at intervals of between 10 μm to 20 μm, only a few of which are shown for simplicity. A plurality of the second conductive signal vias 106b extend from the sections of the second travelling wave signal conductors 82, e.g. in parallel to each other and evenly spaced along the p-type doped semiconductor regions 98a or 98b, depending on which section of the second travelling-wave signal conductor 82, at intervals of between 10 μm to 20 μm, only a few of which are shown for simplicity.

An example of a driving scheme for the optical modulator 70, known as differential drive, both outputs of an RF driver 110, configured for transmitting the modulated radio frequency data signal, are connected through two waveguides 111 to the first and second travelling wave signal conductors 81 and 82, and the outer conductors of both waveguides 111 are grounded via connection to the first and second ground conductors 83 and 84. Both outputs of the RF driver 110 may have a characteristic output impedance 112. Nominal termination loads 86, e.g. 50 ohms for each of S+ and S−, are connected across the distal ends of the first and second travelling wave signal conductors 81 and 82. The outputs from the RF driver 110 are substantially in anti-phase, i.e. S+ and S− are 180° out of phase, and the modulation voltage across the first and second travelling-wave signal conductors 81 and 82 is S+ minus S−, e.g. +/−0.1V-0.5V. In this configuration both RF driver outputs are utilized, greatly improving the power efficiency compared to the single-ended drive condition. The key point is that the two voltage signals S+ and S− have anti-correlated voltages, e.g. if at a specific moment the AC voltage of the S+ travelling wave conductor 81 is 0.5V, then the AC voltage of S− travelling wave conductor 82 is substantially 0.5V. In a real system the voltages are not exactly anti-correlated; however, most of the voltage is. Please note that there could be a DC voltage present too that might or might not be differential, but that doesn't matter at all for cross talk.

Figure 6A:
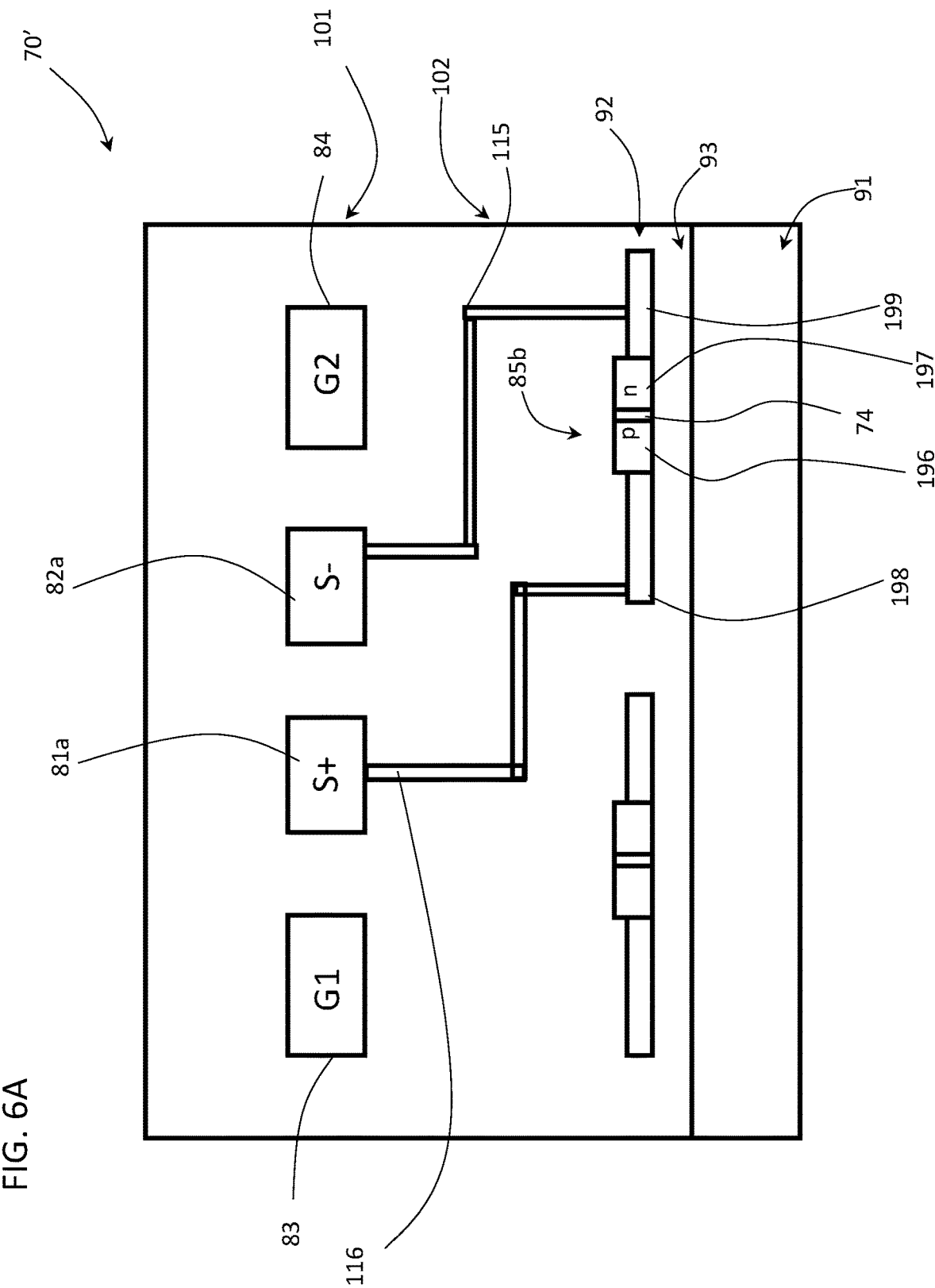
FIG. 6A is a cross-sectional view of the optical modulator of FIG. 5 along section C-C.
Figure 6B:
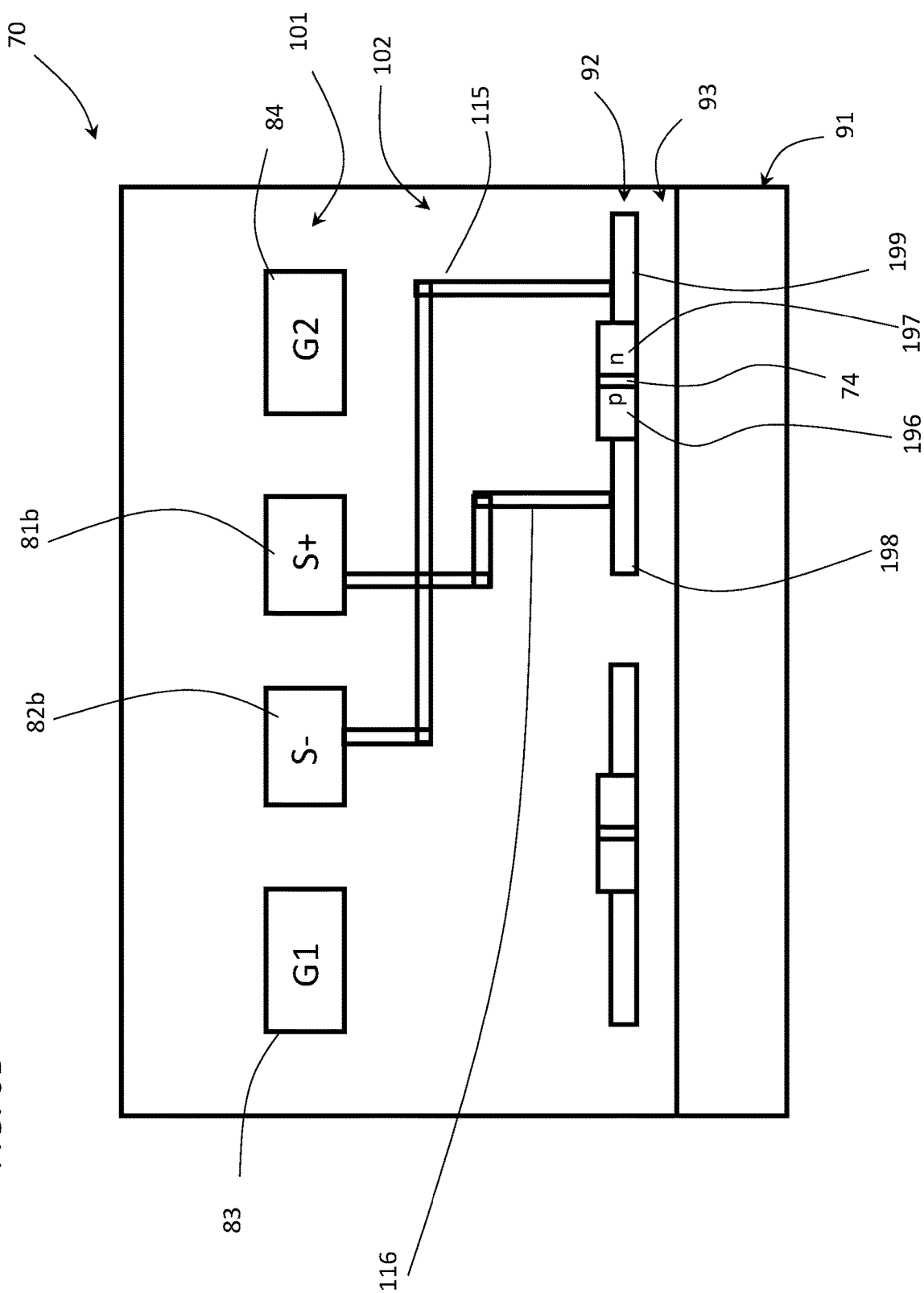
FIG. 6B is a cross-sectional view of the optical modulator of FIG. 5 along section D-D.

According to a second exemplary embodiment of an optical modulator 70' illustrated in FIGS. 5, 6A and 6B, in which like reference numbers relate to the same elements as above, conductive, e.g. metal, n-type signal vias 115 extend downwardly from the sections of the second travelling-wave signal conductor 82, through the one or more dielectric regions 102 to a first n-type contact region 199 of a single phase shifter 185. Conductive, e.g. metal, p-type signal vias 116 extend downwardly from the sections of the first travelling wave signal conductor 81 through the one or more dielectric regions 102 to a first p-type contact region 198. In order to maintain the same polarity for the first p-type contact region 198, a p-type semiconductor region 196, the n-type contact region 199 and n-type semiconductor region 197, along their entire lengths, the conductive p-type signal vias 116 are configured to extend downwardly and laterally offset as well as longitudinally offset from the conductive n-type signal vias 115 in different layers of the one or more dielectric regions 102 in a crisscrossing manner, as illustrated in FIGS. 5 and 6B, so that the conductive p-type signal vias 116 are electrically isolated and insulated from each other and the n-type signal vias 115. In particular, when the sections of the first and second travelling wave conductors 81 and 82 are not directly over the p-type contact region 198 or the n-type contact region 199, the p-type and n-type conductive signal vias 116 and 115 may have to extend beneath the sections of the other polarity first and second travelling-wave conductor 81 and 82, e.g. in a crisscrossing manner. For example, the conductive n-type signal vias 115 extending from the second section 82b of the second travelling-wave signal conductor 82 extend under the second section 81b of the first travelling-wave signal conductor 81 to get to the n-type contact region 199. Similarly, the p-type conductive signal vias 116 extending from the second section 81b of the first travelling-wave signal conductor 81 may extend under the second section 82b of the second travelling-wave signal conductor 82 to get to the p-type contact region 198.

In some embodiments, there are a plurality of conductive n-type signal vias 115 extending from the sections of the second travelling-wave signal conductor 82, e.g. parallel and evenly spaced along the first n-type contact regions 199. Similarly, there may be a plurality of conductive p-type vias 116 extending from the sections of the first travelling-wave signal conductors 81, e.g. parallel and evenly spaced along the first p-type contact regions 198 at intervals of between 10 μm to 20 μm, only a few of which are shown for simplicity.

An example of a driving scheme for the optical modulator 70', known as differential drive, both outputs of an RF driver 110, configured for transmitting the modulated radio frequency data signal, are connected through two waveguides 111 to the first and second travelling-wave signal conductors 81 and 82. Both outputs of the RF driver 110 may have a characteristic output impedance 112. Nominal termination loads 86, e.g. 50 ohms for each of S+ and S−, are connected across the distal ends of the first and second travelling-wave signal conductors 81 and 82. The outputs from the RF driver 110 are substantially in anti-phase, i.e. S+ and S− are 180° out of phase, and the modulation voltage across the first and second travelling wave signal conductors 81 and 82 is S+ minus S−, e.g. +/−0.1V-0.5V. In this configuration both RF driver outputs are utilized, greatly improving the power efficiency compared to the single-ended drive condition. The key point is that S+ and S− have anti-correlated voltages, e.g. if at a specific moment the AC voltage of the S+ travelling wave conductor 81 is 0.5V, then the AC voltage of S− travelling wave conductor 82 is exactly −0.5V. In a real system the voltages are not exactly anti-correlated; however, most of the voltage is. Please note that there could be a DC voltage present too that might or might not be differential, but that doesn't matter at all for cross talk.

Figure 7:
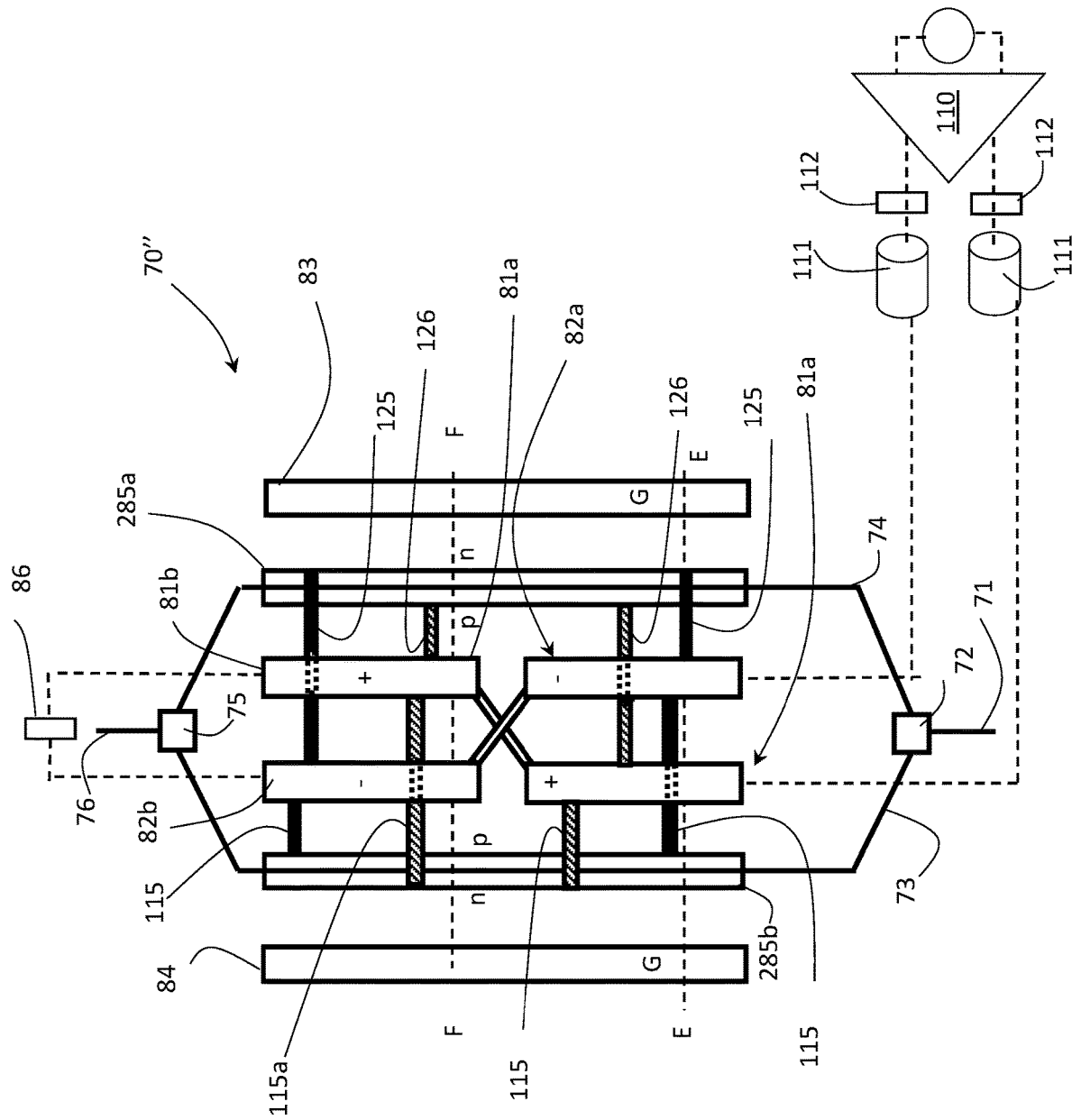
FIG. 7 is a top view of an exemplary embodiment of an optical modulator in accordance with another exemplary embodiment of the present invention.
Figure 8A:
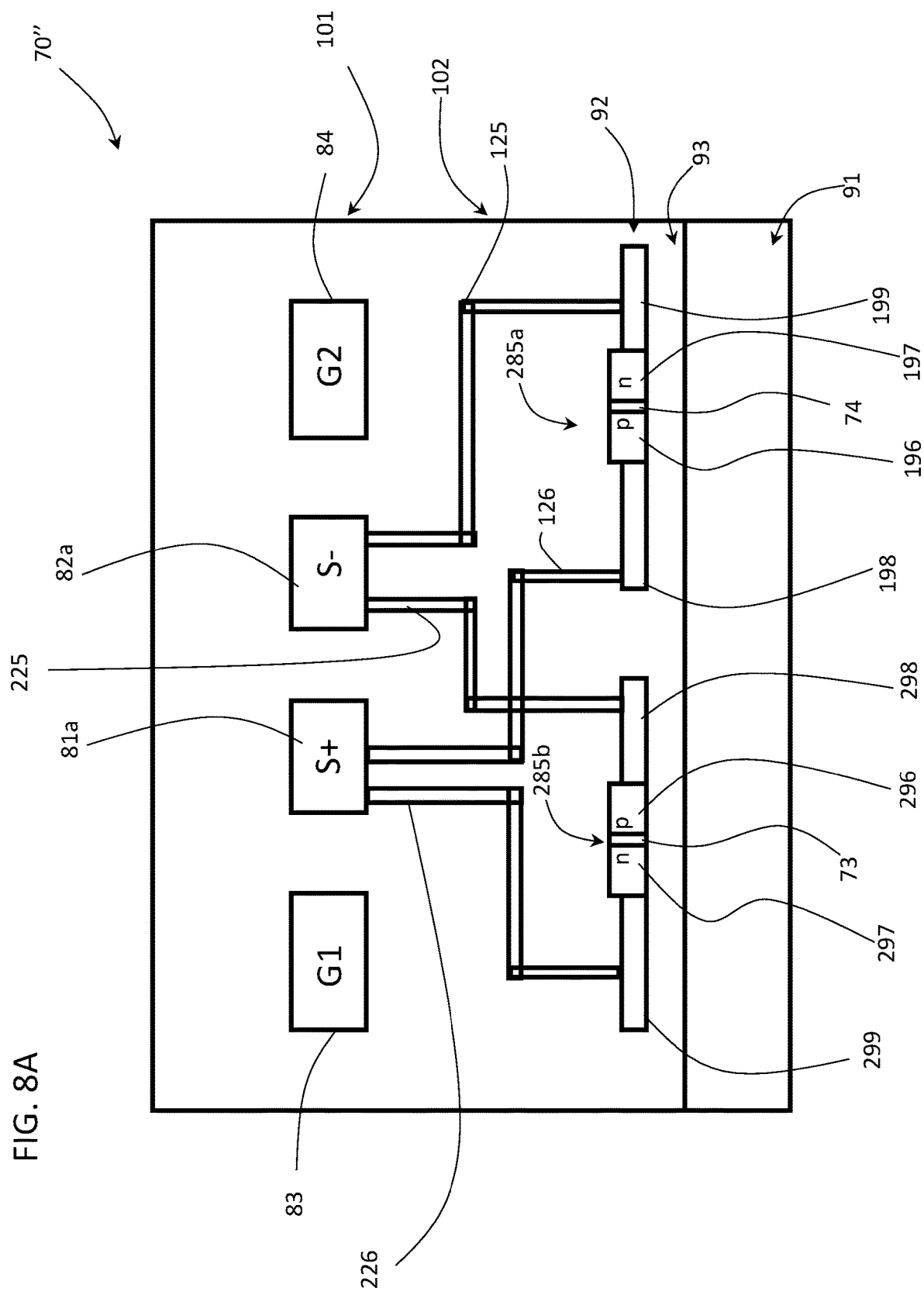
FIG. 8A is a cross-sectional view of the optical modulator of FIG. 7 along section E-E.
Figure 8B:
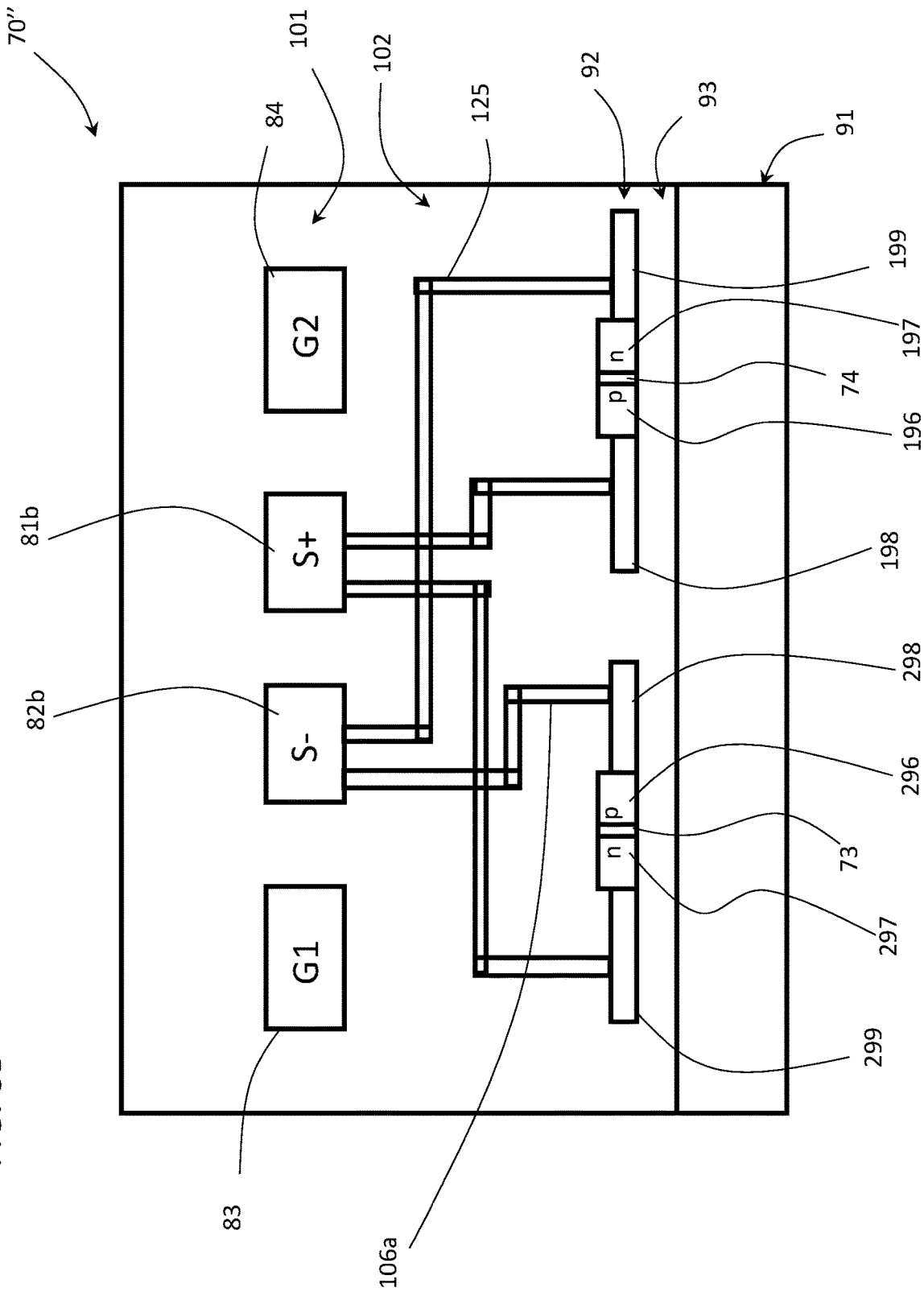
FIG. 8B is a cross-sectional view of the optical modulator of FIG. 7 along section F-F.

According to a third exemplary embodiment of an optical modulator 70″ illustrated in FIGS. 7, 8A and 8B, in which like reference numbers relate to the same elements as above, first conductive, e.g. metal, signal vias 125 extend downwardly from the sections of the second travelling-wave signal conductor 82, e.g. first section 82*a*, through the one or more dielectric regions 102 to a first n-type contact region 199 of a first phase shifter 285*a*. Second conductive, e.g. metal, signal vias 126 extend downwardly from the sections of the first travelling wave signal conductor 81, e.g. first section 81*a*, through the one or more dielectric regions 102 to a first p-type contact region 198. In order to maintain the same polarity for the first p-type contact region 198, the first p-type semiconductor region 196, the first n-type contact region 199 and the first n-type semiconductor region 197, along their entire lengths, the first conductive signal vias 125 are configured to extend downwardly and laterally offset as well as longitudinally offset from the second conductive signal vias 126 in different layers of the one or more dielectric regions 102 in a crisscrossing manner, as illustrated in FIGS. 7, 8A and 8B, so that the first conductive signal vias 125 are electrically isolated and insulated from each other and the second conductive signal vias 126. In particular, when the sections of the first and second travelling wave conductors 81 and 82 are not directly over the p-type contact region 198 or the n-type contact region 199, the first and second conductive signal vias 125 and 126 may have to extend beneath the sections of the other polarity first and second travelling-wave conductor 81 and 82. For example, as in FIG. 8B, the first conductive signal vias 125 extending from the second section 82*b* of the second travelling-wave signal conductor 82 extend under the second section 81*b* of the first travelling-wave signal conductor 81 to get to the n-type contact region 199. Similarly, as in FIG. 8A, the second conductive signal vias 126 extending from the first section 81*a* of the first travelling-wave signal conductor 81 may extend under the first section 82*a* of the second travelling-wave signal conductor 82 to get to the p-type contact region 198.

To further increase the available phase shift between the first and second optical waveguide paths 73 and 74, a second phase shifter 285*b* may be provided including a second p-type semiconductor region 296, a second n-type semiconductor region 297, a second p-type contact region 298, a second n-type contact region 299. Accordingly, third conductive, e.g. metal, signal vias 225 extend downwardly from the sections of the second travelling-wave signal conductor 82, e.g. first section 82*a*, through the one or more dielectric regions 102 to the second p-type contact region 298 of the second phase shifter 285*b*, i.e. the contact region with the opposite polarity to the first n-type contact region 197 to which the first conductive signal vias 125 extend. Fourth conductive, e.g. metal, signal vias 226 extend downwardly from the sections of the first travelling wave signal conductor 81, e.g. first section 81*a*, through the one or more dielectric regions 102 to the second n-type contact region 299, i.e. the contact region with the opposite polarity to the second p-type contact region 198 to which the second conductive signal vias 126 extend. In order to maintain the same polarity for the first p-type contact region 298, the first p-type semiconductor region 196, the first n-type contact region 199 and the first n-type semiconductor region 197, along their entire lengths, the first, second, third and fourth conductive signal vias 125, 126, 225, 226 are configured to extend downwardly and laterally offset as well as longitudinally offset from each other in different layers of the one or more dielectric regions 102 in a crisscrossing manner, if necessary, as illustrated in FIGS. 7, 8A and 8B, so that the first, second, third and fourth conductive signal vias 125 are electrically isolated and insulated from each other. In particular, when the sections of the first and second travelling wave conductors 81 and 82 are not directly over the p-type contact region 198 or the n-type contact region 199, the first, second, third and fourth conductive signal vias 125, 126, 225 and 226 may have to extend beneath the sections of the other polarity first and second travelling-wave conductor 81 and 82. For example, as in FIG. 8B, the first conductive signal vias 125, extending from the second section 82*b* of the second travelling-wave signal conductor 82, extend under the second section 81*b* of the first travelling-wave signal conductor 81 to get to the n-type contact region 199. Similarly, as in FIG. 8A, the second conductive signal vias 126 extending from the first section 81*a* of the first travelling-wave signal conductor 81 may extend under the first section 82*a* of the second travelling-wave signal conductor 82 to get to the p-type contact region 198.

In some embodiments, there are a plurality of first and third conductive signal vias 115 and 125 extending from the sections of the second travelling-wave signal conductor 82, e.g. parallel and evenly spaced along the first n-type contact region 199 and the second p-type contact region 298, respectively. Similarly, there may be a plurality of second and fourth conductive vias 116 and 126 extending from the sections of the first travelling-wave signal conductors 81, e.g. parallel and evenly spaced along the first p-type contact regions 198 and the second n-type contact region 299, respectively, at intervals of between 10 μm to 20 μm, only a few of which are shown for simplicity.

An example of a driving scheme for the optical modulator 70″, known as differential drive, both outputs of an RF driver 110, configured for transmitting the modulated radio frequency data signal, are connected through two waveguides 111 to the first and second travelling-wave signal conductors 81 and 82. Both outputs of the RF driver 110 may have a characteristic output impedance 112. Nominal termination loads 86, e.g. 50 ohms for each of S+ and S−, are connected across the distal ends of the first and second travelling-wave signal conductors 81 and 82. The outputs from the RF driver 110 are substantially in anti-phase, i.e. S+ and S− are 180° out of phase, and the modulation voltage across the first and second travelling wave signal conductors 81 and 82 is S+ minus S−, e.g. +/−0.1V-0.5V. In this configuration both RF driver outputs are utilized on both the first and second optical waveguide paths 73 and 74, greatly improving the power efficiency compared to the single-ended drive condition. The key point is that S+ and S− have anti-correlated voltages, e.g. if at a specific moment the AC voltage of the S+ travelling wave conductor 81 is 0.5V, then the AC voltage of S− travelling wave signal conductor 82 is exactly −0.5V, therefore each of the first and second optical waveguide paths 73 and 74 receive +0.5V and −0.5V. In a real system the voltages are not exactly anti-correlated; however, most of the voltage is. Please note that there could be a DC voltage present too that might or might not be differential, but that doesn't matter at all for cross talk.

The aforementioned multi-layer PIC structure, with the first and second travelling wave signal conductors 81 (S+)

and 82 (S−) positioned over top of but spaced apart from the first and second waveguide paths 73 and 74 enables a plurality of optical modulators 70a, 70b and 70c, which may be any one or optical modulators 70, 70' or 70", to be configured in close proximity with one another and with a high fill factor on the PIC. To further reduce size restraints on the optical modulators 70 or 70' or 70", the first and second travelling wave signal conductors 81 (S+) and 82 (S−) are about 4 µm wide and about 3-4 µm thick, the first and second ground conductor 83 and 84 are about 12 µm wide and about 3-4 µm thick, and all of the conductors 81-84 are spaced apart by about 6 µm from the adjacent conductor 81-84. Furthermore, as illustrated in FIG. 2, adjacent optical modulators 70a, 70b and 70c can share the same ground conductor 84, e.g. the conductive ground vias 105a and/or 105b from adjacent optical modulators 70 extend to the same first and/or second ground conductor 83 and 84.

The foregoing description of one or more example embodiments has been presented for the purposes of illustration and description. It is not intended to be exhaustive or to limit the invention to the precise form disclosed. Many modifications and variations are possible in light of the above teaching. It is intended that the scope of the disclosure be limited not by this detailed description.

I claim:

1. An optical modulator system comprising:
   a first optical modulator comprising:
   a first input port for receiving a first input optical signal;
   a first optical beam splitter for splitting the first input optical signal into a first optical sub-beam and a second optical sub-beam;
   a first optical waveguide path optically coupled to the first optical beam splitter for transmitting the first optical sub-beam,
   a first optical phase shifting section configured to adjust a first phase of the first optical sub-beam;
   a second optical waveguide path optically coupled to the first optical beam splitter for transmitting the second optical sub-beam,
   a first optical beam combiner optically coupled to the first optical waveguide path and the second optical waveguide path for combining the first optical sub-beam and the second optical sub-beam into a first modulated optical output signal;
   a first driver configured for transmitting a modulated radio frequency data signal;
   a first positive polarity signal contact electrically coupled between the first driver and the first optical phase shifting section, and comprising a first positive polarity electrode section and a second positive polarity electrode section extending along parallel but non-colinear paths; and
   a first negative polarity signal contact electrically coupled between the first driver and the first optical phase shifting section, and comprising a first negative polarity electrode section extending parallel to the first positive polarity electrode section and colinear with the second positive polarity electrode section, and a second negative polarity electrode section extending parallel to the second positive polarity electrode section and colinear with the first positive polarity electrode section;
   a second optical phase shifting section configured to adjust a second phase of the second optical sub-beam;
   wherein the first positive polarity signal contact is electrically coupled between the first driver and the second optical phase shifting section; and
   wherein the first negative polarity signal contact is electrically coupled between the first driver and the second optical phase shifting section;
   wherein the first optical phase shifting section comprises:
   a first p-type semiconductor region adjacent to the first optical waveguide path;
   a first p-type contact region extending from the first p-type semiconductor region and electrically connected to the first positive polarity electrode section and the second positive polarity electrode section;
   a first n-type semiconductor region adjacent to the first optical waveguide path; and
   a first n-type contact region, extending from the first n-type semiconductor region and electrically connected to the first negative polarity electrode section and the second negative polarity electrode section;
   wherein the second optical phase shifting section comprises:
   a second p-type semiconductor region adjacent to the second optical waveguide path;
   a second p-type contact region extending from the second p-type semiconductor region and electrically connected to the first negative polarity electrode section and the second negative polarity electrode section;
   a second n-type semiconductor region adjacent to the second optical waveguide path; and
   a second n-type contact region, extending from the second n-type semiconductor region and electrically connected to the first positive polarity electrode section and the second positive polarity electrode section;
   wherein the optical modulator system comprises a photonic integrated circuit (PIC) comprising:
   a first waveguide layer including the first input port, the first optical beam splitter, the first optical waveguide path, the first optical phase shifting section, the second optical waveguide path, the second optical phase shifting section, and the first optical beam combiner;
   a first upper back end of line region including the first positive polarity signal contact, and the first negative polarity signal contact;
   one or more dielectric regions between waveguide layer and the upper back end of line region;
   a first plurality of contact vias extending downwardly through the one or more dielectric regions from the first positive polarity electrode section and from the second positive polarity electrode section to the first p-type contact region;
   a second plurality of contact vias extending downwardly through the one or more dielectric regions from the first negative polarity electrode section and the second negative polarity electrode section to the first n-type contact region;
   wherein some of the first plurality of contact vias include portions that extend underneath the first negative polarity signal contact to reach the first p-type contact region.

2. The optical modulator system according to claim 1, wherein the first positive polarity signal contact includes a third positive polarity electrode section extending adjacent to the first optical waveguide path; and wherein the first negative polarity signal contact includes a third negative polarity electrode section extending adjacent to the second optical waveguide path.

3. The optical modulator system according to claim 2, wherein the first positive polarity electrode section has a first length that is shorter than a second length of the second positive polarity electrode section.

4. The optical modulator system according to claim 3, wherein the first length is about ¼ an overall length of the first positive polarity signal contact; wherein the second length is about ½ the overall length of the first positive polarity signal contact; and wherein a third length of the third positive polarity electrode section is about ¼ the overall length of the first positive polarity signal contact.

5. An optical modulator system comprising:
a first optical modulator comprising:
a first input port for receiving a first input optical signal;
a first optical beam splitter for splitting the first input optical signal into a first optical sub-beam and a second optical sub-beam;
a first optical waveguide path optically coupled to the first optical beam splitter for transmitting the first optical sub-beam,
a first optical phase shifting section configured to adjust a first phase of the first optical sub-beam;
a second optical waveguide path optically coupled to the first optical beam splitter for transmitting the second optical sub-beam,
a first optical beam combiner optically coupled to the first optical waveguide path and the second optical waveguide path for combining the first optical sub-beam and the second optical sub-beam into a first modulated optical output signal;
a first driver configured for transmitting a modulated radio frequency data signal;
a first positive polarity signal contact electrically coupled between the first driver and the first optical phase shifting section, and comprising a first positive polarity electrode section and a second positive polarity electrode section extending along parallel but non-colinear paths; and
a first negative polarity signal contact electrically coupled between the first driver and the first optical phase shifting section, and comprising a first negative polarity electrode section extending parallel to the first positive polarity electrode section and colinear with the second positive polarity electrode section, and a second negative polarity electrode section extending parallel to the second positive polarity electrode section and colinear with the first positive polarity electrode section; and
a second optical modulator comprising:
a second input port for receiving a second input optical signal;
a second optical beam splitter for splitting the second input optical signal into a third optical sub-beam and a fourth optical sub-beam;
a third optical waveguide path optically coupled to the second optical beam splitter for transmitting the third optical sub-beam,
a third optical phase shifting section configured to adjust a third phase of the third optical sub-beam;
a fourth optical waveguide path optically coupled to the second optical beam splitter for transmitting the fourth optical sub-beam;
a fourth optical phase shifting section configured to adjust a fourth phase of the fourth optical sub-beam;
a second optical beam combiner optically coupled to the third optical waveguide path and the fourth optical waveguide path for combining the third optical sub-beam and the fourth optical sub-beam into a second modulated optical output signal;
a second driver configured for transmitting a second modulated radio frequency data signal;
a second positive polarity signal contact electrically coupled between the second driver and the third optical phase shifting section, and comprising a third positive polarity electrode section and a fourth positive polarity electrode section extending along parallel but non-colinear paths; and
a second negative polarity signal contact electrically coupled between the first driver and the first optical phase shifting section, and comprising a third negative polarity electrode section extending parallel to the third positive polarity electrode section and colinear with the fourth positive polarity electrode section, and a fourth negative polarity electrode section extending parallel to the fourth positive polarity electrode section and colinear with the third positive polarity electrode section;
wherein the first positive polarity electrode section has a different length than the third positive polarity electrode section;
wherein the second positive polarity electrode section has a different length than the fourth positive polarity electrode section;
wherein the first negative polarity electrode section has a different length than the third negative polarity electrode section; and
wherein the second negative polarity electrode section has a different length than the fourth negative polarity electrode section.

6. The optical modulator system according to claim 5, wherein the first optical phase shifting section comprises:
a first p-type semiconductor region adjacent to the first optical waveguide path;
a first p-type contact region extending from the first p-type semiconductor region and electrically connected to the first positive polarity electrode section and the second positive polarity electrode section;
a first n-type semiconductor region adjacent to the first optical waveguide path; and
a first n-type contact region, extending from the first n-type semiconductor region and electrically connected to the first negative polarity electrode section and the second negative polarity electrode section.

7. The optical modulator system according to claim 6, further comprising a second optical phase shifting section configured to adjust a second phase of the second optical sub-beam;
wherein the first positive polarity signal contact is electrically coupled between the first driver and the second optical phase shifting section; and
wherein the first negative polarity signal contact is electrically coupled between the first driver and the second optical phase shifting section.

8. The optical modulator system according to claim 7, wherein the second optical phase shifting section comprises:
a second p-type semiconductor region adjacent to the second optical waveguide path;
a second p-type contact region extending from the second p-type semiconductor region and electrically connected to the first negative polarity electrode section and the second negative polarity electrode section;
a second n-type semiconductor region adjacent to the second optical waveguide path; and
a second n-type contact region, extending from the second n-type semiconductor region and electrically connected to the first positive polarity electrode section and the second positive polarity electrode section.

9. The optical modulator system according to claim 8, wherein the optical modulator system comprises a photonic integrated circuit (PIC) comprising:
a first waveguide layer including the first input port, the first optical beam splitter, the first optical waveguide path, the first optical phase shifting section, the second optical waveguide path, the second optical phase shifting section, and the first optical beam combiner;
a first upper back end of line region including the first positive polarity signal contact, and the first negative polarity signal contact;
one or more dielectric regions between waveguide layer and the upper back end of line region;
a first plurality of contact vias extending downwardly through the one or more dielectric regions from the first positive polarity electrode section and from the second positive polarity electrode section to the first p-type contact region;
a second plurality of contact vias extending downwardly through the one or more dielectric regions from the first negative polarity electrode section and the second negative polarity electrode section to the first n-type contact region.

10. The optical modulator system according to claim 9, wherein some of the first plurality of contact vias include portions that extend underneath the first negative polarity signal contact to reach the first p-type contact region.

11. An optical modulator system comprising:
a first optical modulator comprising:
a first input port for receiving a first input optical signal;
a first optical beam splitter for splitting the first input optical signal into a first optical sub-beam and a second optical sub-beam;
a first optical waveguide path optically coupled to the first optical beam splitter for transmitting the first optical sub-beam,
a first optical phase shifting section configured to adjust a phase of the first optical sub-beam;
a second optical waveguide path optically coupled to the first optical beam splitter for transmitting the second optical sub-beam;
a second optical phase shifting section configured to adjust a phase of the second optical sub-beam;
a first optical beam combiner optically coupled to the first optical waveguide path and the second optical waveguide path for combining the first optical sub-beam and the second optical sub-beam into a first modulated optical output signal;
a first driver configured for transmitting a modulated radio frequency data signal;
a first positive polarity signal contact electrically coupled between the first driver and the first optical phase shifting section, and comprising a first positive polarity electrode section and a second positive polarity electrode section extending along parallel but non-colinear paths;
a first ground contact electrically coupled to the first optical phase shifting section;

a first negative polarity signal contact electrically coupled between the first driver and the second optical phase shifting section, and comprising a first negative polarity electrode section extending parallel to the first positive polarity electrode section and colinear with the second positive polarity electrode section, and a second negative polarity electrode section extending parallel to the second positive polarity electrode section and colinear with the first positive polarity electrode section; and
a second ground contact electrically coupled to the second optical phase shifting section.

12. The optical modulator system according to claim 11, wherein the first optical phase shifting section comprises:
a first p-type semiconductor region adjacent to the first optical waveguide path;
a first p-type contact region extending from the first p-type semiconductor region,
a first n-type semiconductor region adjacent to the first optical waveguide path; and
a first n-type contact region, extending from the first n-type semiconductor region.

13. The optical modulator system according to claim 12, wherein the second optical phase shifting section comprises:
a second p-type semiconductor region adjacent to the second optical waveguide path;
a second p-type contact region extending from the second p-type semiconductor region,
a second n-type semiconductor region adjacent to the second optical waveguide path; and
a second n-type contact region, extending from the second n-type semiconductor region.

14. The optical modulator system according to claim 13, wherein the optical modulator system comprises a photonic integrated circuit (PIC) comprising:
a first waveguide layer including the first input port, the first optical beam splitter, the first optical waveguide path, the first optical phase shifting section, the second optical waveguide path, the second optical phase shifting section, and the first optical beam combiner;
a first upper back end of line region including the first positive polarity signal contact, the first negative polarity signal contact, the first ground contact, and the second ground contact;
one or more dielectric regions between waveguide layer and the upper back end of line region;
a first plurality of contact vias extending downwardly through the one or more dielectric regions from the first positive polarity electrode section and the second positive polarity electrode section to the first p-type contact region;
a second plurality of contact vias extending downwardly through the one or more dielectric regions from the first negative polarity electrode section and the second negative polarity electrode section to the second p-type contact region;
a third plurality of contact vias extending downwardly through the one or more dielectric regions from the first ground contact to the first n-type contact region; and
a fourth plurality of contact vias extending downwardly through the one or more dielectric regions from the second ground contact to the second n-type contact region.

15. The optical modulator system according to claim 14, some of the first plurality of contact vias include portions that extend underneath the first negative polarity signal contact to reach the first p-type contact region.

16. The optical modulator system according to claim 14, further comprising:
a second optical modulator comprising:
  a second input port for receiving a second input optical signal;
  a second optical beam splitter for splitting the second input optical signal into a third optical sub-beam and a fourth optical sub-beam;
  a third optical waveguide path optically coupled to the second optical beam splitter for transmitting the third optical sub-beam,
  a third optical phase shifting section configured to adjust a third phase of the third optical sub-beam;
  a fourth optical waveguide path optically coupled to the second optical beam splitter for transmitting the fourth optical sub-beam,
  a fourth optical phase shifting section configured to adjust a fourth phase of the fourth optical sub-beam;
  a second optical beam combiner optically coupled to the third optical waveguide path and the fourth optical waveguide path for combining the third optical sub-beam and the fourth optical sub-beam into a second modulated optical output signal;
  a second driver configured for transmitting a second modulated radio frequency data signal;
  a second positive polarity signal contact coupled between the second driver and the third optical phase shifting section, and comprising a third positive polarity electrode section, a fourth positive polarity electrode section, and a fifth positive polarity electrode section extending collinearly with the third positive polarity electrode section and parallel to the fourth positive polarity electrode section;
  a third ground electrode electrically coupled to the third optical phase shifting section;
  a second negative polarity signal contact electrically coupled between the second driver and the fourth optical phase shifting section, and comprising a third negative polarity electrode section extending adjacent to the third positive polarity electrode section, a fourth negative polarity electrode section extending adjacent to the fourth positive polarity electrode section, and a fifth negative polarity electrode section extending adjacent to the fifth positive polarity electrode section;
  wherein the second ground contact is also coupled to the fourth optical phase shifting section.

17. The optical modulator system according to claim 11, wherein the first positive polarity signal contact includes a third positive polarity electrode section extending adjacent to the first optical waveguide path; and
wherein the first negative polarity signal contact includes a third negative polarity electrode section extending adjacent to the second optical waveguide path.

18. The optical modulator system according to claim 17, wherein the first positive polarity electrode section has a first length that is shorter than a second length of the second positive polarity electrode section.

19. The optical modulator system according to claim 18, wherein the first length is about ¼ an overall length of the first positive polarity signal contact; wherein the second length of the first positive polarity electrode section is about ½ the overall length of the first positive polarity signal contact; and wherein a third length of the third positive polarity electrode section is about ¼ the overall length of the first positive polarity signal contact.

* * * * *